United States Patent [19]

Seragnoli

[11] 4,344,445

[45] Aug. 17, 1982

[54] APPARATUS FOR DIRECTLY LINKING ONE OR MORE CIGARETTE MAKING MACHINES TO ONE OR MORE CIGARETTE PACKING MACHINES

[75] Inventor: Enzo Seragnoli, Bologna, Italy

[73] Assignee: G. D Societa per Azioni, Bologna, Italy

[21] Appl. No.: 210,043

[22] Filed: Nov. 24, 1980

[30] Foreign Application Priority Data

Dec. 11, 1979 [IT] Italy .............................. 3566 A/79

[51] Int. Cl.³ .............................................. A24C 5/35
[52] U.S. Cl. ................................... 131/282; 131/283; 221/107
[58] Field of Search .............. 131/283, 282, 280, 909, 131/910; 221/107

[56] References Cited

U.S. PATENT DOCUMENTS 3,355,004 11/1967 Rupert ................................ 131/283
4,149,545 4/1979 Hall .................................... 131/283

FOREIGN PATENT DOCUMENTS 1154307 2/1967 United Kingdom ................ 131/283
1224295 3/1971 United Kingdom ................ 131/283
1299174 12/1972 United Kingdom ................ 131/283

Primary Examiner—V. Millin
Attorney, Agent, or Firm—Browdy & Neimark

[57] ABSTRACT

Disclosed herein is an apparatus for directly linking one or more cigarette making machines to one or more cigarette packing machines. A provision is made for one or more variable volume storage units for compensating production imbalances between the machines.

The storage units extend along constant curvature paths and support and convey the cigarettes, utilizing continuous belts mounted endlessly around extremity rollers of truncated cone shape.

Turnbuckles that exert a radial force with respect to the arc described by each storage unit, restrain and guide the belts.

5 Claims, 4 Drawing Figures

APPARATUS FOR DIRECTLY LINKING ONE OR MORE CIGARETTE MAKING MACHINES TO ONE OR MORE CIGARETTE PACKING MACHINES

BACKGROUND OF THE INVENTION

The invention relates to an apparatus for directly linking one or more cigarette making machines to one or more cigarette packing machines and, in particular, to the variable volume storage unit or units that form part of the apparatus and have the task of compensating production imbalances between the machines.

DESCRIPTION OF THE PRIOR ART

In order to render the foregoing more clear, it is necessary to point out that plants having of at least one machine for the individual production of cigarettes and at least one machine for packing the cigatettes can generally be divided into two separate categories, depending on the way in which the cigarettes are infed to the packing machines.

To the first of the said categories belong what are known as "indirect feed" plants, wherein the cigarettes produced by each cigarette making machine are grouped in containers that are subsequently discharged into an input hopper with which each packing machine is provided.

Inside the said hoppers, the cigarettes are formed into batches and are arranged in a predetermined orderly fashion ready to be supplied to the wrapping line of the relevant packing machine.

To the second of the aforementioned categories belong what are known as "direct feed" plants, wherein the exit of each cigarette making machine is linked, in a substantially direct way, to the input hopper of a packing machine, and the cigarettes pass from each cigarette making machine to the packing machines in a virtually continuous fashion.

The description given herein relates to the second type of infeed and, in order to make matters more simple, consideration will be given hereinafter to a plant constituted by a single cigarette making machine linked directly to a single packing machine.

The said direct link-up is commonly achieved through the use of infeed lines delimited by stationary and/or movable walls, along which the cigarettes, arranged transversely with respect to the infeed direction, are made to move forward stacked one on top of the other.

It has been seen, however, that a direct link-up of the type described cannot be implemented without means being provided along the path followed by the said lines for compensating production imbalances between the cigarette making machine and the cigarette packing machine, caused by the difference in the output speed of the said machines, or by an accidental stoppage or by one of them slowing down.

A variable volume storage unit described in U.S. Pat. No. 3,355,004 is known, which is constituted by one or more rectilinear chambers or channels that open onto the said lines.

The conveyor on which the cigarettes are supported and carried along is, in each of the said channels, constituted by a continuous belt, mounted endlessly on extremity rollers.

The capacity of the storage unit is variable because of the presence, inside each chamber, of a back wall, integral with the said belt and movable in the direction of the length of the said chamber.

The absorption and/or the delivery of cigarettes on the part of the storage unit in the event of either the packing machine or the cigarette making machine halting or running at reduced speed, is regulated by control devices that are sensitive to variations in the flow of cigarettes in the aforementioned line.

One problem that is not negligible with the described storage units is the fact that, because of their elongated shape, they are not able to satisfy contemporaneously the two particularly necessary requirements of large capacity and limited overall dimensions.

For this reason variable volume storage units have been proposed that are conceptually similar to those described but which extend along spiral paths that cater more suitably for the exigencies outlined above.

In a storage unit of this particular type described in U.K. Pat. No. 1,299,174, the movable wall on whichthe mass of cigarettes is supported and carried along, is constituted by a laterally flexible conveyor.

This latter characteristic, indispensable in the storage unit under examination on account of the presence of both straight and curved sections (at least one straight section is necessary to connect the two extremities of the spiral and to give the belt continuity), is achieved by making the said conveyor out of plastic material pieces that are interconnected by slotting one into the other, these being laterally flexible because of a suitable zigzag shape given to them by deep lateral flutes that are staggered one with respect to the other.

This configuration of the conveyor has been seen to have serious limitations as to its tensile strength.

The said pieces of plastic material are, in fact, liable to break quite frequently because of the elastic deformation they constantly undergo in matching their shape to that of a variable curvature path.

The resistant sections of pieces have to be suitably limited so as not to jeopardize the lateral elasticity of the conveyor.

SUMMARY OF THE INVENTION

The object of the invention is to create a variable volume storage unit that is able to combine with the high capacity and the reduced overall dimensions of known storage units that extend along curved paths, all the qualities (strength in particular) of rectilinear storage units wherein belt conveyors are used for supporting and carrying along the cigarettes.

This and other objects are all attained with the apparatus according to the invention for directly linking one or more cigarette making machines to one or more cigarette packing machines, comprising: a plurality of lines for transferring a mass of cigarettes, placed horizontally in order and parallel one with the other, with a movement direction crosswise with respect to the axes of the cigarettes; at least one storage chamber for compensating production imbalances between the machines, constituted by a channel that runs into the said lines whose lower limit, along the full path thereof, is set by a conveyor on which the cigarettes are supported and carried along, and comprising a wall, integral with and virtually vertical with respect to the said conveyor, that is movable between two positions of extremity of the said storage chamber corresponding to a condition in which the said storage chamber is completely full and one in which it is completely empty, respectively; and reversible motor means for driving the conveyor with a longitudinal movement in the two directions. Essential features of the invention include being that the storage chamber extends with a constant curvature with respect to a vertical axis and that the conveyor is constituted by a continuous belt mounted endlessly on truncated cone shape rollers placed in the region of the extremities of the storage chamber. The said rollers are mounted on axes that pass through the said vertical axis, and at least one of them being connected to the said reversible motor means, the said storage chamber comprising, furthermore, fixed means for sustaining the said belt, placed in the region of one of the branches thereof on which the cigarettes are supported and carried along, and turnbuckle means, radial with respect to the vertical axis, for the conveyor.

BRIEF DESCRIPTION OF THE DRAWINGS

Further characteristics and advantages will emerge more obviously from the detailed description that follows of two forms of storage units according to the invention, illustrated purely as non-limiting examples in the accompanying drawings, in which.

DESCRIPTION OF THE PREFERRED EMBODIMENTS

Figure 1:
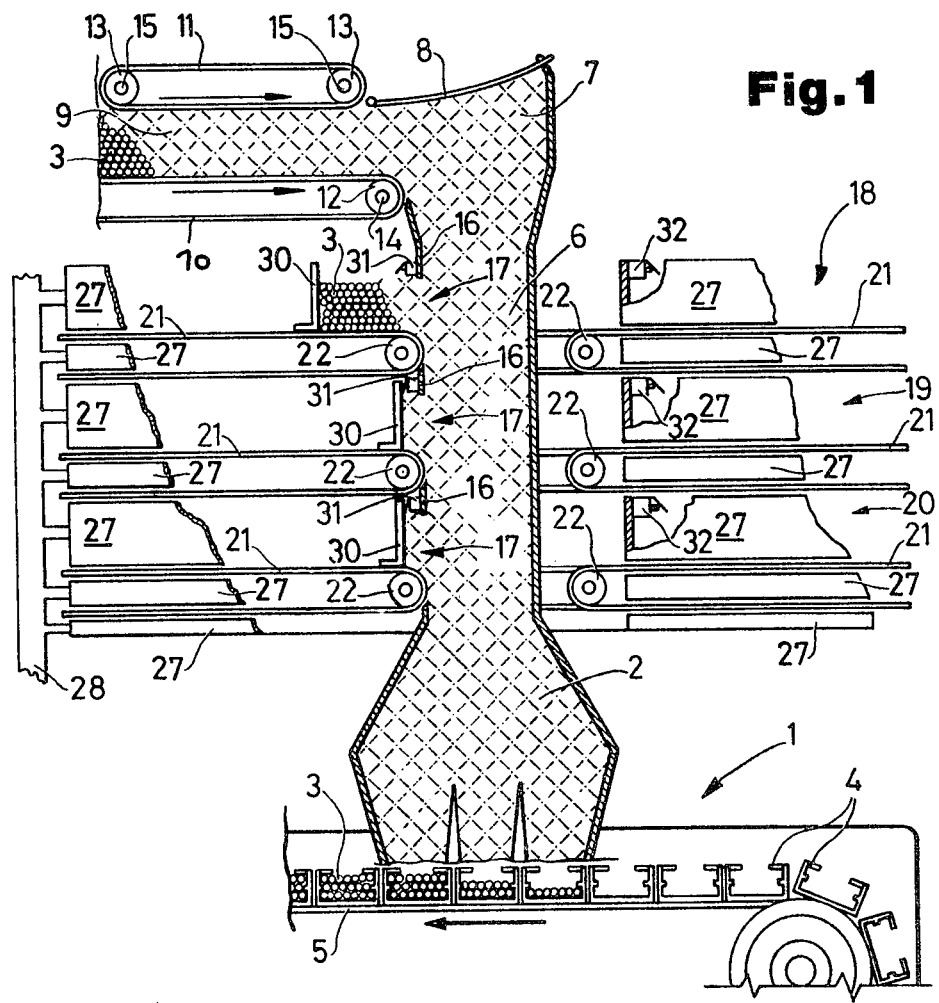
FIG. 1 shows, diagrammatically in a front cutaway view, one embodiment the invention apparatus.

In FIG. 1 a cigarette packing machine 1, only visible in part, is shown, the inlet to which is constituted by a hopper 2 that contains cigarettes 3.

Batched numerically in a pre-established order, the cigarettes 3 are transferred, in a way that is not illustrated, from the bottom of the hopper 2 to inside the trays 4 with which an intermittently movable conveyor belt 5, that constitutes the commencement of the packeting line, is provided.

The said cigarettes 3 reach the hopper 2 from above, via a substantially vertical line 6, the depth of which is slightly greater than the length of one cigarette. The cigarettes 3 fall by gravity along the said line 6, stacked one on the other and placed transversely with respect to the infeed direction. The upper extremity of the said line 6 communicates with the bottom of a chamber 7, delimited at the top by a movable wall 8 more about which will be said below.

The lefthand side of the chamber 7 is in communication with the righthand extremity of a virtually horizontal line 9, defined at the bottom and at the top by the conveyor belts 10 and 11, respectively, that are mounted endlessly on rollers 12 and 13 carried on horizontal spindles 14 and 15 parallel to the transported cigarettes 3.

The said belts 10 and 11 are given a continuous forward movement and when the cigarette making machine is operating properly, they feed with continuity to the chamber 7 a mass of cigarettes 3 stacked there between.

The said movable wall 8 is, for example, constituted by a flexible diaphragm, and it is part of a control device of a known type.

Fixed in a rotatable fashion at one extremity, it rests on the mass of cigarettes contained in the said chamber 7.

The said mass exerts on the lateral walls of the chamber 7 and on the movable wall 8, a pressure that normally falls within a minimum and a maximum pre-established value.

In the event of, for any reason at all, the absorption of cigarettes on the part of the packeting machine 1 undergoing a reduction, the pressure inside the chamber 7 increases until it reaches and exceeds the said maximum value.

When, instead, the quantity of cigarettes produced by the cigarette making machine drops, the said pressure is reduced until it becomes less than the said minimum value. The said variations beyond the pre-established limits are detected by sensor means (not shown) placed above the movable wall 8.

One wall 16 of the line 6, on the left in FIG. 1, is provided with a suitable number of apertures 17 - three for example in the form of embodiment illustrated in the above mentioned figure - superposed one over the other and substantially rectangular.

The said apertures 17, of a width slightly greater than the length of one cigarette, constitute the inlet/outlet mouths of three corresponding chambers or channels of variable capacity, shown from top to bottom at 18, 19 and 20.

The said chambers 18, 19 and 20 are identical one with the other and thus the corresponding parts that go to make them up are, for this reason, all indicated with the same numbers.

By way of an example, consideration will be given hereunder to the chamber 18.

This extends along an arc of circumference that lies in a horizontal plane and utilizes, as the surface on which the cigarettes 3 are rested and carried, the substantially horizontal upper branch of a laterally indeformable continuous belt 21 mounted endlessly on two truncated cone shape support and drive rollers 22.

The said truncated cone shape rollers 22, sustained in a way that is not shown, are placed with the axes thereof converging at one point of the axis of the chamber 18, and with the vertices thereof turned towards the said point, and they are suitably inclined so as to keep the upper branch of the belt 21 virtually horizontal.

One of the truncated cone shape rollers 22 of each chamber is placed, externally to the line 6, at the side of the lower border of one of the said apertures 17.

Non-illustrated reversible motor means interdependent on sensor means connected to the movable wall 8 can provide one or both of the said truncated cone shape rollers with a two-way rotatory motion.

Figure 2:
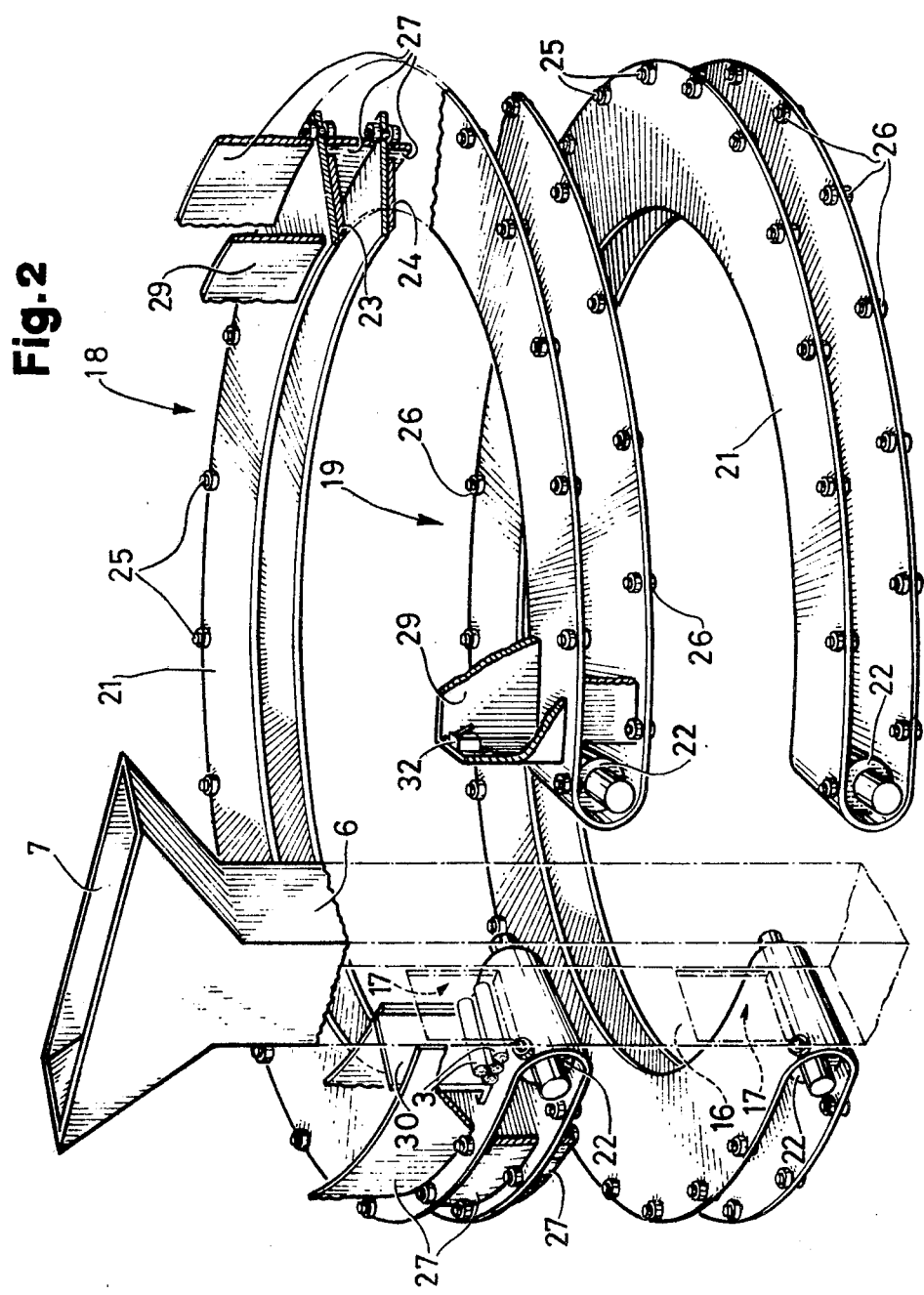
FIG. 2 shows, in a perspective view with certain parts in sectional form or removed so that others may become more apparent, a part of FIG. 1.

Two horizontal plates 23 and 24, fashioned in the form of circular ring sectors, constitute the means of support for the upper and lower branches of the belt 21, respectively (see FIG. 2).

The outer border of the said belt 21 has passing through it, a plurality of vertical pins 25 that are spread out, spaced suitably one from the other, over the full length thereof.

Each of the said pins 25, integral with the belt 21, supports rotatably two rollers 26, one placed above the said belt 21 and the other below it.

The said rollers 26 rest against the radially external surfaces of annular contrast walls 27 that are supported coaxially to the chambers 18, 19 and 20 by vertical bars 28 positioned at the side of the said chambers (only one of which can be seen in FIG. 1), and almost touch, at the bottom and at the top, both branches of each belt 21.

In combination with the walls 27, the rollers 26 constitute turnbuckle or tensioning means that exert on the belt 21 a radial force with respect to the axis of the chamber 18.

The wall 27 that almost touches the surface of the belt 21 on which the cigarettes 3 rest also has, as regards the latter, a function of lateral restraint, in combination with a similar annular wall 29 of a lesser diameter that is concentric thereto and is supported in a way that is not shown.

To the said surface of the upper branch of the belt 21 is transversely fixed a vertical wall 30 that is movable integrally therewith in order to vary the capacity of the chamber 18 in the way that will be described.

The wall 30 can pass through the chamber 18 between a position in which it is higher than the truncated cone shape roller 22 at the side of the aperture 17 and a position close to the other truncated cone shape roller 22.

Limit sensor devices 31 and 32, supported suitably in the region of the aforementioned extreme positions, cause the means that furnish motion to the truncated cone shape rollers 22 to come to a stop, and set them ready to start up in the opposite direction once the said wall 30 reaches them. The cessation of motion in one and the other instance coincides, as will be seen, with the chamber 18 having either been emptied or filled.

The operation of the first embodiment for the invention will now be explained. The chambers 18, 19 and 20 can be provided with a common source of motion which causes them to all operate contemporaneously in an identical fashion.

Alternatively, it is possible to give each one an independent source of motion, with appropriate operating and control means being provided, which cause them to come into operation in succession (to absorb or yield cigarettes). The means in question are not illustrated since they are well known to experts in the industry concerned and, in any case, are amply described in U.S. Pat. No. 4,142,622 held by the same applicant as herein, namely G.D S.p.A. Only when a chamber has been filled (or emptied) does the filling with cigarettes (or the emptying of the cigarettes) commence for a subsequent chamber.

Prior to running the cigarette making machine and the cigarette packeting machine 1, the line 9, the chamber 7, the line 6 and the hopper 2 need to be filled with cigarettes stacked in the way outlined.

Furthermore, it is good policy, so that the chambers 18, 19 and 20 be able to react to any cessation in operation or slowing down of the stated machines right from the time the plant is started up, to half fill all three chambers in such a way that they can both yield and accept cigarettes.

The rated production capacity of the cigarette making machine and of the cigarette packeting machine 1 served by the former is so programmed that the number of cigarettes produced by the cigarette making machine corresponds to the number of cigarettes absorbed by the cigarette packeting machine 1.

Under normal operating conditions for the machines in question, the cigarettes 3 coming from the line 9 slide continuously along the line 6, after having passed through the chamber 7, and the pressure inside the latter is maintained at limit values that fall within those mentioned previously.

Should, at a given moment in the process, the packeting machine 1 either slow down or come to a halt, the pressure inside the chamber 7 rises on account of the cigarettes 3 that continue to flow out of the cigarette making machine.

Once the pressure in the region of the movable wall 8 exceeds the upper limit value, the sensor means cause the starting up of the means that provide motion to the truncated cone shape rollers 22 of one or more of the chambers 18, 19, 20, with a direction of rotation such as to bring about, in each chamber wherein cigarettes have to be stored in excess, the moving away of the wall 30, integral with the belt 21, from the corresponding aperture 17 in the line 6.

Subsequently to this, the cigarettes can, in the region of each of the chambers 18, 19, 20, issue laterally from the said line 9 via an aperture 17 urged, by the overpressure created inside the said line 9, and pass onto the corresponding belt 21 in the form of a layer whose free extremity is delimited by the annular walls 27 and 29.

If the condition of inactivity of the packeting machine 1 continues and thus in the chamber 7 the pressure exerted by the cigarettes is maintained at a level higher than the pre-established upper limit value, the belt 21 stays in operation and the wall 30 continues to move away from the corresponding aperture 17 since it is integral with the said belt 21.

The arrival, on the part of a wall 30, at one of the limit sensor devices 32 coincides with the filling having taken place of the relevant chamber 18, 19 or 20, and brings about the halting of the means that provide this with motion.

In the case of independently operated chambers, as outlined above, the filling of one chamber is followed by the starting up of the means that provide motion to another which, in turn, can begin to be filled.

The entry of cigarettes into the said chambers 18, 19 and 20 continues, if in the meantime the operation of the complete plant has not returned to normal, until all three have been fully filled.

At this juncture, the last limit sensor device 32 to be reached by a wall 30 causes the cigarette making machine to stop. When the chambers operate contemporaneously there may be only one of the said limit sensor devices.

Should, instead, the packeting machine 1 be set anew in operation or be returned to its rated output before all three chambers 18, 19, 20 are full, the drop in pressure inside the chamber 7 causes, through the movable wall 8 and the said sensor means, the halting of the means that provide motion to the chamber (or chambers) being filled.

Should, at a given moment in the process, the cigarette making machine either slow down or come to a halt, the pressure inside the chamber 7 falls until it drops below the lower limit value, and the said sensor devices cause the means that provide motion to the truncated cone shape rollers 22 belonging to one or more of the chambers 18, 19 or 20, to start up in an opposite direction of rotation to that considered up until now.

The said chambers 18, 19, 20, in a way similar to that outlined so far (only the direction in which the belts 21 move forward changes) thus commence, one at a time, or all together, to discharge the cigarettes 3 onto the line 6 via one or all of the apertures 17, thereby guaranteeing a normal supply of cigarettes to the packeting machine 1 until all the said chambers have been emptied.

The emptying of each of the chambers 18, 19, 20 is completed once the corresponding wall 30 reaches a limit sensor device 31 whose function is identical to that of the limit sensor devices 32 described previously.

Similarly to what has been said in respect of the preceding possibility, the halting of the complete plant occurs compulsorily once the last (or the sole sensor device in the case of chambers that operate at the same time), namely limit sensor device 31, is reached by a wall 30.

Figure 4:
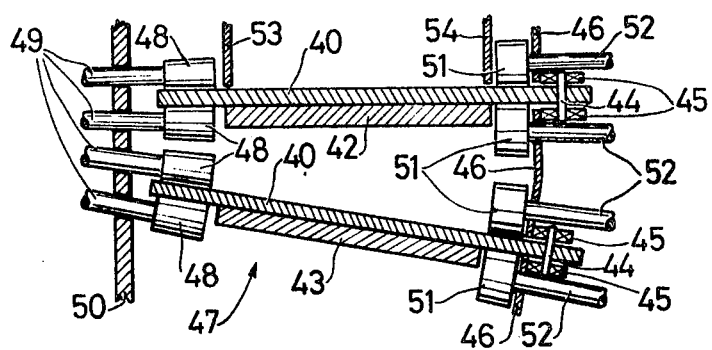
FIG. 4 shows, diagrammatically, one detail in FIG. 3 in an enlarged scale and in sectional form.
Figure 3:
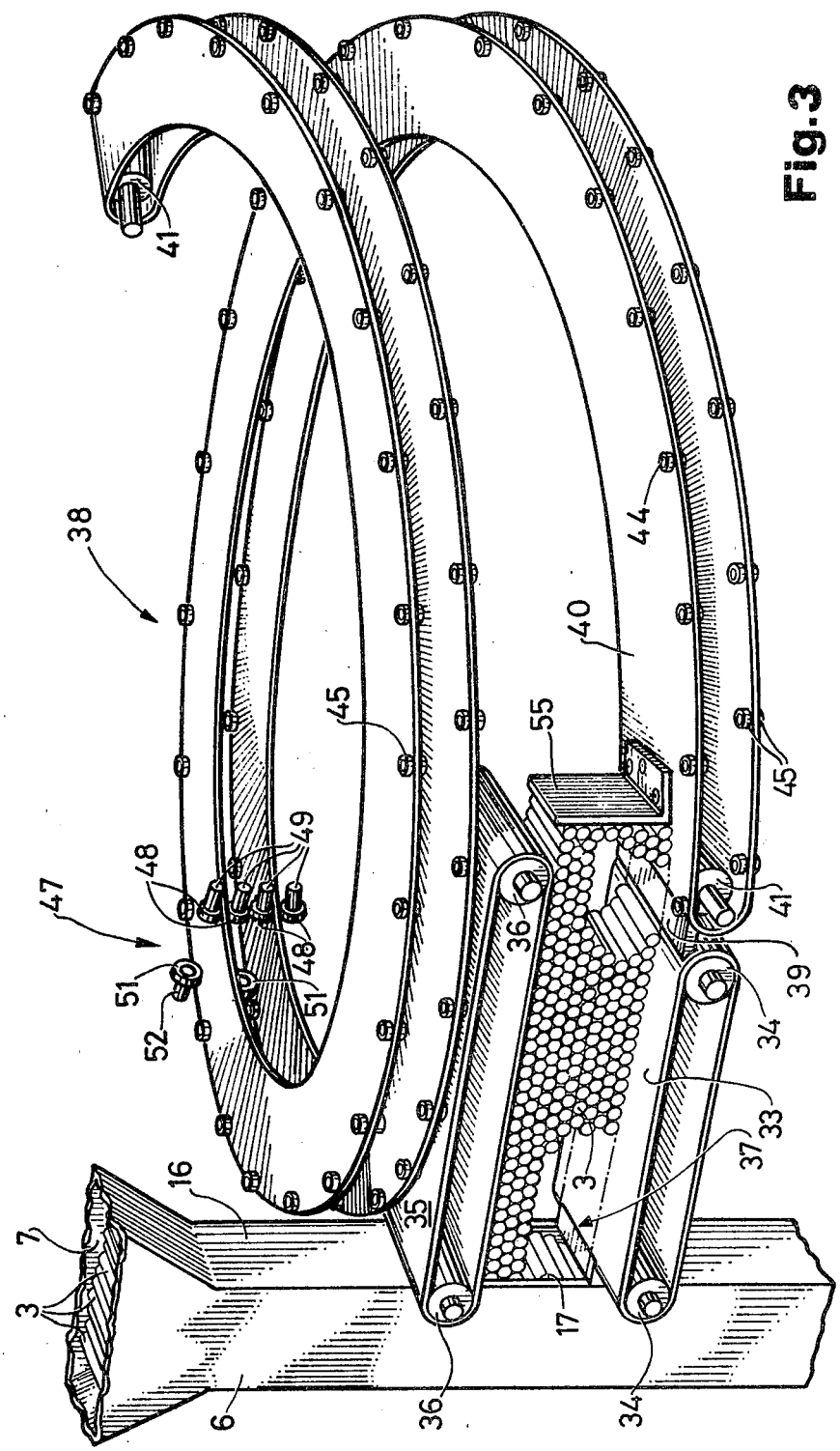
FIG. 3 shows, in a perspective view with certain parts in sectional form or removed so that others may become more apparent, a second embodiment of the invention apparatus.

A second embodiment of the apparatus according to the invention is depicted diagrammatically in FIGS. 3 and 4.

In accordance with what is illustrated in FIG. 3, the line 6 is provided laterally with one single rectangular aperture 17.

Virtually tangent with the lower border of this, externally to the line 6, is the lefthand extremity of a horizontal conveyor belt 33, mounted endlessly on two rollers 34. A similar horizontal conveyor belt 35, mounted endlessly on the rollers 36, is placed, in an identical fashion, at the side of the upper border of the said aperture 17.

The said belts 33 and 35, moved in the two directions by non-illustrated motor means, via the rollers 34 and 36, define a channel that links the said line 6 to a variable capacity chamber shown globally at 38.

The righthand extremity of the belt 33 and the mouth of the said chamber 38 are joined by a horizontal plate 39.

The said chamber 38, that extends along a section in the form of a cylindrical helix on a vertical axis, with a constant radius, utilizes the upper branch of a laterally indeformable belt 40, mounted endlessly on two truncated cone shape support and drive rollers 41.

The said belt 40 can be made by superposing and joining the extremities of two identical belts curved laterally to form a cylindrical helix.

The vertices of the truncated cone shape rollers 41 are incident with the axis of the said helix, and the axes thereof are inclined in such a way that the upper branch of the belt 40, that constitutes the surface on which the cigarettes rest, is devoid of any lateral inclination, at least at the two extremities.

One or both of the said truncated cone shape rollers 41 can be given a two-way rotatatory motion by non-illustrated motor means that are interdependent on the sensor means connected to the movable wall 8 to which reference was made in the description of the first form of embodiment for the invention.

At 42 and 43 there are two helical support plates, seen in sectional form in FIG. 4, supported in a non-illustrated way by the upper and the lower branch of the belt 40, respectively.

The external border of the said belt 40 supports a plurality of vertical equidistant pins 44 that are spread out at regular intervals over the full length of the said belt.

Each pin sustains, above and below the belt 40, a pair of rollers 45 whose characteristics and functions correspond exactly to those of the previously mentioned rollers 26.

These rest against the radially external surfaces of helical shape contrast walls 46 that are supported in a non-illustrated fashion and almost touch, at the bottom and at the top, both branches of the belt 40.

Along the extension path of the belt 40 provision can be made, in order to render the drive smoother, particularly when the belts are of a considerable length, for auxiliary motion providing means that cooperate with the truncated cone shape extremity rollers 41.

Such auxiliary means, for a chamber 38 that extends along a number of spiral turns, can be located, for example, at distances apart of one spiral turn from one another, the purpose of this being to exercise a uniform driving action on the belt 40.

In FIG. 3, they are depicted placed virtually halfway along the belt 40 and are shown at 47, while the view in FIG. 4, which is a cutaway view of the said belt 40, shows diagrammatically one embodiment.

The internal border of both branches of the belt 40 is enclosed between a pair of superposed truncated cone shape rollers 48 tangent thereto along a generatrix, in the region of the said auxiliary means 47.

The said rollers 48 are supported coaxially by the righthand extremities (FIG. 4) of the shafts 49, with their vertices placed on the axis of the chamber 38.

The said shafts 49 are supported rotatably by a fixed vertical wall 50 that flanks the internal edge of the belt 40, and they can be turned in the two directions by non-illustrated reversible motor means.

The peripheral speed of the truncated cone shape rollers 48 as a consequence of the said drive is identical to that with which the belt 40 can be moved under the action of the truncated cone shape rollers 41.

To the left of the walls 46, with reference to FIG. 4, both branches of the belt 40 are in between pairs of truncated cone shape rollers 51 which fully correspond, as regards charactertics and operation, to the rollers 48 that have just been described, the righthand extremity of which is supported by drive shafts 52 that pass through the walls 46.

The mass of cigarettes along the belt 40 is guided laterally by two vertical walls, fashioned in the form of a helix and numbered from the inside to the outside at 53 and 54, and supported in a way that is not illustrated.

To the upper branch of the belt 40 is transversely secured a vertical wall 55, similar to the aforementioned walls 30, and movable integrally therewith in order to vary the capacity of the chamber 38. The said wall 55 can pass through the said chamber 38 between a position in which it is in a higher position than the truncated cone shape roller 41 at the side of the plate 39 and a position close to the other truncated cone shape roller 41.

Two non-illustrated limit sensors, similar to the said sensors 31 and 32, placed in the region of the aforementioned extreme positions of the wall 55, cause the means that furnish motion to the truncated cone shape rollers 41, 48 and 51 to come to a stop, and set them ready to start up in the opposite direction once the said wall 55 reaches them. The cessation of motion in one and the other instance coincides with the chamber 38 having either been emptied or filled.

In the second embodiment of the invention, described the mode of operation is similar to that outlined with respect to the first embodiment.

It is obvious from the foregoing that both embodiments of the invention attain the pre-established objects and that both, with limited overall dimensions of the chambers, allow large quantities of cigarettes to be stored therein.

Furthermore, the fact of having overcome any need to laterally bend the belts 21 and 40 by shaping them suitably and making them follow a path with a constant curvature, greatly increases the reliability of the chambers described and practically eliminates temporary stops on the part of the complete plant due to the belts 21 and 40 breaking.

It should be noted that they way in which the described chambers 18, 19, 20 and 38 have been positioned in the plant under examination is purely an example, and that it is not the only one possible. Indeed, they could be placed at any other point in the plant in the region of which they are able to accept or yield cigarettes.

To render the motion of the belts 21 and 40 smoother and more certainly slip proof with respect to the truncated cone shape rollers 22, 41, 48 and 51, the possibility is also envisaged of peripherally providing the latter with rings of teeth, preferably of truncated cone shape, destined to engage with corresponding holes provided in the said belts 21 and 40 over the full length thereof.

What is claimed is:

1. Apparatus including at least one cigarette making machine and at least one cigarette packing machine, and means for directly linking said at least one cigarette making machine to said at least one cigarette packing machine comprising: at least one line for transferring a mass of cigarettes from said at least one making machine to said at least one packing machine, means to place cigarettes horizontally and parallel one with the other on said transferline and to move said cigarettes in a direction crosswise to their axes; said direct linking means comprising at least one storage chamber to compensate for production imbalances between said machines, said direct linking means comprising a channel that runs into said line and comprising a conveyor, running along the full path thereof on which the cigarettes are supported and carried along, and comprising a wall, integral with and substantially vertical with respect to said conveyor, that is movable between two positions of extremity of said storage chamber corresponding to conditions in which said storage chamber is completely full and one in which it is completely empty, respectively; a reversible motor means driving the said conveyor longitudinally to and fro in two directions opposite one another, essential features of said apparatus including that said direct linking means is formed with a constant radius of curvature around a vertical axis, said conveyor being constituted by a continuous endless belt mounted on truncated cone shape rollers placed in the region of the extremities of said storage chamber, said cone shaped rollers being mounted on axes that pass through said vertical axis, at least one of said cone shaped rollers being drivingly connected to said reversible motor means, said storage chamber comprising, furthermore, fixed means for sustaining said conveyor belt at least in the region on which the cigarettes are supported and carried along, and turnbuckle means for stretching said conveyor in directions radial with respect to said vertical axis.

2. Apparatus according to claim 1, wherein the said storage chamber extends along an arc of a circle.

3. Apparatus according to claim 1, wherein the said storage chamber extends along an arc of a cylindrical helix.

4. Apparatus according to claim 1 wherein the said drive means are constituted by at least one pair of counter-rotating truncated cone shape rollers that grip the belt in promixity to one border thereof and are mounted on axes that pass through said vertical axis.

5. Apparatus according to claim 1 or 2, wherein there are a plurality of said storage chambers and essential features are that these are placed at different levels along a vertical line of said linking apparatus.

* * * * *